(12) United States Patent
Sharma et al.

(10) Patent No.: US 10,460,141 B2
(45) Date of Patent: Oct. 29, 2019

(54) PER-CHANNEL COLOR BARCODES FOR DISPLAYS

(71) Applicants: Gaurav Sharma, Webster, NY (US); Karthik Dinesh, Rochester, NY (US)

(72) Inventors: Gaurav Sharma, Webster, NY (US); Karthik Dinesh, Rochester, NY (US)

(73) Assignee: University of Rochester, Rochester, NY (US)

( * ) Notice: Subject to any disclaimer, the term of this patent is extended or adjusted under 35 U.S.C. 154(b) by 1 day.

(21) Appl. No.: 15/596,535

(22) Filed: May 16, 2017

(65) Prior Publication Data

US 2017/0344776 A1 Nov. 30, 2017

Related U.S. Application Data

(60) Provisional application No. 62/343,364, filed on May 31, 2016.

(51) Int. Cl.
*G06K 7/14* (2006.01)
*G06K 19/08* (2006.01)
(Continued)

(52) U.S. Cl.
CPC ........... *G06K 7/1426* (2013.01); *G06K 1/123* (2013.01); *G06K 7/146* (2013.01); *G06K 7/1443* (2013.01);
(Continued)

(58) Field of Classification Search
CPC ... G06K 19/06037; G06K 2019/06225; G06K 7/1417; G06K 7/14; G06K 1/121; G06T 1/0042; H04N 1/32208; H04N 1/32309
(Continued)

(56) References Cited

U.S. PATENT DOCUMENTS 5,591,956 A 1/1997 Longacre, Jr. et al.
5,612,524 A 3/1997 Sant'Anselmo et al.
(Continued)

OTHER PUBLICATIONS

ISO/IEC, "Information technology—Automatic identification and data capture techniques—EAN/UPC bar code symbology specification," http://www.iso.org/iso/iso_catalogue/catalogue_ics/catalogue_detail_ics.htm?csnumber=46143 , 2009, accessed Jan. 2011.
(Continued)

*Primary Examiner* — Daniel St Cyr
(74) *Attorney, Agent, or Firm* — Harris Beach PLLC

(57) ABSTRACT

A method of decoding a coherent RGB color barcode captured by a RGB camera includes: displaying a coherent RGB color barcode on the RGB display; capturing an image of the displayed barcode; performing a pilot block RGB color interference cancellation process to estimate a per pixel color interference; applying the per pixel color interference to the image of the displayed coherent RGB color barcode to extract each separate barcode of the coherent RGB color barcode; binarizing each of the three separate monochrome grey images of each barcode of the coherent RGB color barcode; and decoding each of the three separate binarized monochrome grey images to provide a decoded data for each barcode of the coherent RGB color barcode displayed on the RGB display. A method of decoding an incoherent RGB color barcode captured by a mobile device RGB camera is also described.

15 Claims, 10 Drawing Sheets
(8 of 10 Drawing Sheet(s) Filed in Color)

(51) Int. Cl.
  *G06K 1/12* (2006.01)
  *G06K 19/06* (2006.01)
(52) U.S. Cl.
  CPC .... *G06K 19/0614* (2013.01); *G06K 19/06112* (2013.01)
(58) Field of Classification Search
  USPC ............... 235/435, 439, 454, 462.01, 462.04
  See application file for complete search history.

(56) References Cited

U.S. PATENT DOCUMENTS

| | | | | |
|---|---|---|---|---|
| 2001/0006192 | A1* | 7/2001 | Watanabe | G06K 7/14 235/462.25 |
| 2002/0074407 | A1* | 6/2002 | Koyanagi | G06K 7/14 235/462.16 |
| 2003/0117262 | A1* | 6/2003 | Anderegg | G06K 19/06046 340/5.53 |
| 2005/0109846 | A1* | 5/2005 | Lubow | G06K 19/06028 235/462.01 |
| 2008/0048044 | A1* | 2/2008 | Zhao | G06K 7/14 235/494 |
| 2009/0102179 | A1* | 4/2009 | Lo | G09F 3/0292 283/79 |
| 2010/0243747 | A1* | 9/2010 | Saito | G06K 19/06028 235/494 |
| 2010/0282856 | A1* | 11/2010 | Bulan | G06K 7/14 235/494 |

OTHER PUBLICATIONS

Information technology—Automatic identification and data capture techniques—QR Code 2005 bar code symbology specification, http://www.iso.org/iso/iso_catalogue/catalogue_ics/catalogue_detail_ics.htm?csnumber=43655 , 2006, accessed Jan. 2011.
Information technology—Automatic identification and data capture techniques—Aztec Code bar code symbology specification, http://www.iso.org/iso/iso_catalogue/catalogue_tc/catalogue_detail.htm?csnumber=41548 , 2008, accessed Apr. 2011.
Hao, T., et al., "COBRA: Color Barcode Streaming for Smartphone Systems," 2012, MobiSys '12 (pp. 85-97).
Parikh, D., et al., "Localization and Segmentation of a 2D High Capacity Color Barcode," 2008, IEEE Workshop on Applications of Computer Vision (WACV) (pp. 1-6).
Bulan, O., et al, "Color QR Codes: Increased Capacity Via Per-Channel Data Encoding and Interference Cancellation," 2011, Society for Imaging Science and Technology, 19th Color and Imaging Conference Final Program and Proceedings (pp. 156-159).
John, R. A., et al., "Desiging a 2D Color Barcode," May 2015, 28th IEEE Canadian Conference on Electrical and Computer Engineering (pp. 297-301).
Blasinski, H., et al., "Per-Colorant-Channel Color Barcodes for Mobile Applications: An Interference Cancellation Framework," 2013, IEEE Transactions on Image Processing, vol. 22, No. 4 (pp. 1498-1511).
Sharma, G., "Image-based Data Interfaces Revisited: Barcodes and Watermarks for the Mobile and Digital Worlds," 2016, 8th International Conference on Communication Systems and Networks (COMSNETS) (pp. 1-6).
Rohs, M., "Real-World Interaction with Camera Phones," 2004, Ubiquitous Computing Systems (pp. 74-89).
Scott, D., et al., "Using Visual Tags to Bypass Bluetooth Device Discovery," 2005, Mobile Computing and Communications Review, vol. 9, No. 1 (pp. 41-53).
Fetter, M., et al., "Magneticode: Physical mobile interaction through time-encoded magnetic identification tags," 2014, Procs. of the 8th Intl. Conf. on Tangible, Embedded and Embodied Interaction (pp. 205-212).
Zhang, B, et al., "SBVLC: secure Barcode-Based Visible Light Communication for Smartphones," 2016, IEEE Transactions on Mobile Computing, vol. 15, No. 2 (pp. 432-446).
"Walmart launches mobile payments processor." http://www.businessinsider.com/walmart-launches-mobile-payments-processor-2015-12?IR=T , Posted on Dec. 14, 2015 in Business Insider (3 pgs).
"Wal-mart adds to mobile wallet frenzy with walmart pay." http://www.reuters.com/article/us-wal-mart-mobilepayment-idUSKBN0TT0E620151210 , Posted on Dec. 10, 2015 in Reuters (2 pgs.).
ISO/IEC, "ISO/IEC 18092:2013 Information technology—Telecommunications and information exchange between systems—Near Field Communication—Interface and Protocol (NFCIP-1)," 2013. [Online]. Available: http://standards.iso.org/ittf/PubliclyAvailableStandards/c056692_ISO_IEC_18092_2013.zip.
Finkenzeller, K., RFID Handbook: Radio-frequency identification fundamentals and applications, 1999 (480 pgs.).
ISO/IEC, "ISO/IEC 15693-1:2010 Identification cards—Contactless integrated circuit cards—Vicinity cards—Part 1: Physical characteristics," 2010. [Online]. Available: http://www.iso.org/iso/home/store/catalogue_tc/catalogue_detail.htm?csnumber=39694.
ISO/IEC 14443-1:2008 Identification cards—Contactless integrated circuit cards—Proximity cards—Part 1: Physical characteristics. [Online]. Available: http://www.iso.org/iso/home/store/catalogue_tc/catalogue_detail.htm?csnumber=39693.
Langlotz, T., et al., "Unsynchronized 4D Barcodes," 2007, Advances in Visual Computing (pp. 363-374).
Bulan, O., et al., "Improved Color Barcodes Via Expectation Maximization Style Interference Cancellation," 2012, IEEE Intl. Conf. Acoustics Speech and Sig. Proc. (pp. 1509-1512).
Sharma, G., "LCDs Versus CRTs—Color-Calibration and Gamut Considerations," 2002, Proceedings of the IEEE, vol. 90, No. 4 (pp. 605-622).
Proakis, J., et al., "Digital Communications," 2008, McGraw-Hill Higher Education, Fifth Edition (pp. 1028-1084).
Otsu, N., "A Threshold Selection Method from Gray-Level Histograms," 1979, IEEE Transactions on Systems, Man and Cybernetics, vol. SMC-9, No. 1 (pp. 62-66).
Baharav, Z., et al., "Visually Significant QR Codes: Image Blending and Statistical Analysis," 2013, IEEE Intl. Conf. on Multimedia and Expo (ICME) (6 pgs.).

* cited by examiner

B Channel

G Channel

R Channel

RGB Stripes

| DSR comparison | R | G | B |
|---|---|---|---|
| OT | 48/54 | 50/58 | 47/53 |
| PB+AT | 49/52 | 53/56 | 49/51 |
| EM | 35/39 | 46/46 | 39/40 |

FIG. 10

PER-CHANNEL COLOR BARCODES FOR DISPLAYS

CROSS-REFERENCE TO RELATED APPLICATIONS

This application claims priority to and the benefit of U.S. provisional patent application Ser. No. 62/343,364, PER-CHANNEL COLOR BARCODES FOR DISPLAYS, filed May 31, 2016, which application is incorporated herein by reference in its entirety.

FIELD OF THE APPLICATION

The application relates to barcodes, particularly to methods for generating and decoding color barcodes intended for display on an RGB display and to methods for error reduction in the decoding process.

BACKGROUND

In the background, other than the bolded paragraph numbers, non-bolded square brackets ("[ ]") refer to the citations listed hereinbelow.

Barcodes encode data in a machine readable image format. 1-D patterns (vertical lines) have been used for barcodes such as the universal product code (UPC) [1]. With ready availability of image sensors, 2-D barcodes have also gained prominence. Most popular and commonly used 2-D barcodes are the QR code [2], Aztec code [3, 4], and Data Matrix [5]. Both 1-D and 2-D barcodes have traditionally been used in printed black-and-white formats. Several recent efforts have focused on color versions of printed barcodes with a view to increasing the capacity per unit area of footprint. The use of color in printed barcodes presents a number of challenges that prior research has addressed through several innovations [6, 7, 8, 9, 10].

SUMMARY

According to one aspect a method of encoding a coherent RGB color barcode of a chosen type includes: receiving two or three data sequences designated to be encoded in two or three of the R, G, and B channels of a coherent RGB barcode image; based on a barcode type and the two or three data sequences, selecting a geometric layout for a coherent barcode that determines locations relative to each other, of a plurality of synchronization patterns and a plurality of data encoding modules for the coherent color RGB barcode; and creating the coherent RGB barcode image by embedding one each of the data sequences in one each of the R, G, and B channels of the coherent barcode as a monochrome barcode aligned with a selected geometric layout.

In one embodiment, embedding further sets a plurality of colors for regions in the coherent RGB barcode image that include the synchronization patterns to preselected combinations of R, G, and B forming pilot blocks to facilitate decoding.

According to another aspect, a method of decoding a coherent RGB color barcode captured by a mobile device RGB camera by imaging the coherent RGB color barcode displayed by a RGB display includes: displaying a coherent RGB color barcode on the RGB display to provide a displayed coherent RGB color barcode; capturing an image of the displayed coherent RGB color barcode by the mobile device RGB camera to provide a captured image of the coherent RGB color barcode displayed on the RGB display; localizing synchronization patterns in the captured image to determine a geometric layout of the coherent color barcode and an alignment of the geometric layout to the captured image of the coherent RGB color barcode; estimating parameters of an RGB cross-channel interference in the captured image by using regions of the captured image that include synchronization pattern regions and known predetermined pilot block values for these regions set during the coherent barcode encoding process; using the estimated parameters to apply a per pixel color interference cancellation process to the image of the displayed coherent RGB color barcode to extract two or three separate monochrome grey images of each barcode of the coherent RGB color barcode; and decoding the two or three separate monochrome grey images to provide a decoded data for corresponding barcode of the coherent RGB color barcode displayed on the RGB display.

In one embodiment, the mobile device RGB camera includes a smartphone or tablet computer camera.

In another embodiment, the step of providing a RGB display includes providing a computer controlled LCD or LED display.

In yet another embodiment, the step of estimating parameters of the RGB cross-channel interference includes estimating a color interference matrix, and the step of applying the per pixel color interference cancellation to the image of the displayed coherent RGB color barcode includes applying a matrix transform determined by the estimated color interference matrix to RGB values in each pixel of the captured image of the coherent RGB color barcode displayed on the RGB display.

In yet another embodiment, the step of estimating parameters of the RGB cross-channel interference includes estimating a color interference matrix by a least squares process.

According to yet another aspect, a method of decoding a coherent RGB color barcode captured by a mobile device RGB camera by imaging the coherent RGB color barcode displayed by a RGB display includes: displaying a coherent RGB color barcode on the RGB display to provide a displayed coherent RGB color barcode; capturing an image of the displayed coherent RGB color barcode by the mobile device RGB camera to provide a captured image of the coherent RGB color barcode displayed on the RGB display; localizing synchronization patterns in the captured image to determine a geometric layout of the coherent color barcode and an alignment of the geometric layout to the captured image of the coherent RGB color barcode; and extracting as separate monochrome grey images and decoding at least two of three R, G, and B channels of the captured image of coherent RGB color barcode to provide a decoded data for corresponding barcode of the coherent RGB color barcode displayed on the RGB display.

According to yet another aspect, a method of encoding an incoherent RGB color barcode includes: receiving two or three data sequences designated to be encoded in two or three of a R channel, a G channel, and a B channel of a barcode image; and creating an incoherent RGB color barcode image by encoding and embedding, in substantially the same spatial region, one each of the data sequences in one each of the R, G, and B channels of the incoherent barcode as a monochrome barcode.

According to yet another aspect, a method of decoding an incoherent RGB color barcode captured by a mobile device RGB camera by imaging the incoherent RGB color barcode displayed by a RGB display includes: displaying an incoherent RGB color barcode on the RGB display to provide a displayed incoherent RGB color barcode; capturing an image of the displayed incoherent RGB color barcode by the mobile device RGB camera to provide a captured image of the incoherent RGB color barcode displayed on the RGB display; locating a spatial region corresponding to the incoherent RGB color barcode in the captured image; estimating parameters of a RGB cross-channel interference in the captured image by using image RGB values in the located spatial region; using the estimated parameters to apply a per pixel color interference cancellation process to the captured image of the displayed incoherent RGB color barcode to extract two or three separate monochrome grey images of each barcode of the incoherent RGB color barcode; and decoding the two or three separate monochrome grey images to provide a decoded data for corresponding barcode of the coherent RGB color barcode displayed on the RGB display.

In one embodiment, the locating of a spatial region corresponding to the incoherent RGB color barcode in the captured image further includes extracting at least one of three R, G, and B channels of the captured image of coherent RGB color barcode as a separate monochrome grey image and localizing synchronization patterns for the monochrome barcode in the monochrome grey image and using the localization to identify a spatial region corresponding to the incoherent RGB color barcode.

In another embodiment, the mobile device RGB camera includes a smartphone or tablet computer camera.

In yet another embodiment, the step of providing a RGB display includes providing a computer controlled LCD or LED display.

In yet another embodiment, the step of estimating parameters of the RGB cross-channel interference includes estimating a color interference matrix, and the step of applying the per pixel color interference cancellation to the image of the displayed incoherent RGB color barcode includes applying a matrix transform determined by the estimated color interference matrix to the RGB values in each pixel of the captured image of the coherent RGB color barcode displayed on the RGB display.

In yet another embodiment, the step of estimating parameters of the RGB cross-channel interference includes an expectation-maximization EM-type procedure to estimate the color interference matrix by an alternating least squares process.

In yet another embodiment, the EM-type procedure continues until an objective function is minimized below a preset threshold.

According to yet another aspect, a method of decoding an incoherent RGB color barcode captured by a mobile device RGB camera by imaging the incoherent RGB color barcode displayed by a RGB display includes: displaying an incoherent RGB color barcode on the RGB display to provide a displayed incoherent RGB color barcode; capturing an image of the displayed incoherent RGB color barcode by the mobile device RGB camera to provide a captured image of the incoherent RGB color barcode displayed on the RGB display; and extracting as separate monochrome grey images at least two of three R, G, and B channels of the captured image of incoherent RGB color barcode; and locating and decoding monochrome barcodes embedded in the at least two of three R, G, and B channels of the captured image of the incoherent RGB barcode to provide a decoded data for corresponding barcodes of the incoherent RGB color barcode displayed on the RGB display.

In one embodiment, locating of the monochrome barcode embedded in a channel further includes localizing synchronization patterns for the monochrome barcode in the monochrome grey image and using the localization to determine a geometric layout of the monochrome barcode and an alignment of the geometric layout to the monochrome grey image in the channel.

The foregoing and other aspects, features, and advantages of the application will become more apparent from the following description and from the claims.

BRIEF DESCRIPTION OF THE DRAWINGS

Color Drawings: The patent or application file contains at least one drawing executed in color. Copies of this patent or patent application publication with color drawing(s) will be provided by the Office upon request and payment of the necessary fee.

The features of the application can be better understood with reference to the drawings described below, and the claims. The drawings are best appreciated in color renditions and are not necessarily to scale, emphasis instead generally being placed upon illustrating the principles described herein. In the drawings, like numerals are used to indicate like parts throughout the various views.

FIG. 10 is a table showing exemplary Decoding Success Rate comparison for OT, PB+AT and EM methods for the R, G and B channels.

DETAILED DESCRIPTION

Figure 1:
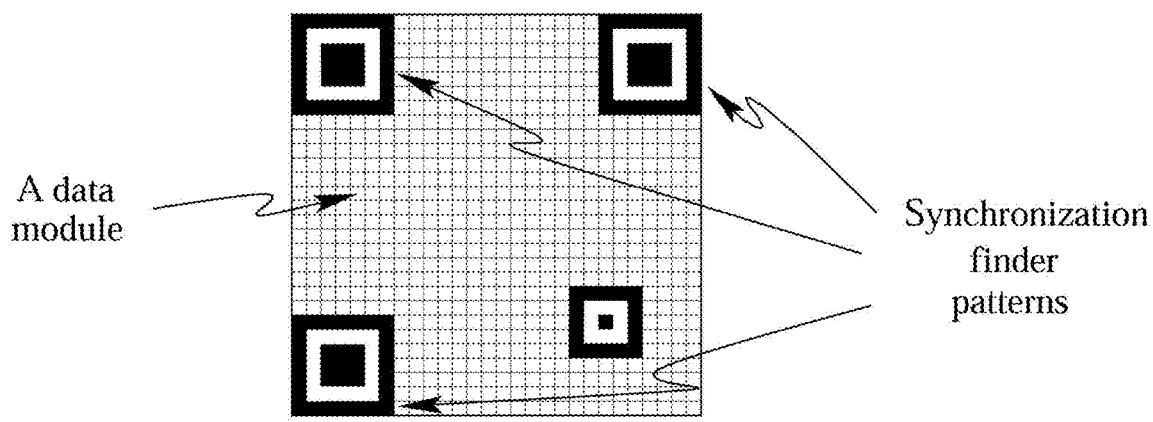
FIG. 1 shows an example geometric layout of a 2D barcode illustrating regions corresponding to synchronization finder patterns and to individual data modules.

In the description, other than the bolded paragraph numbers, non-bolded square brackets ("[ ]") refer to the citations listed hereinbelow.

The application is organized as follows: Part 1 provides an introduction. In Part 2 the per-channel framework for display color barcodes is described. Data encoding, decoding, and cross-channel interference are discussed. By using a physical model for the display and capture process we show that cross channel interference can be modeled by a linear mixing relation. A visual demonstration shows the typical color interference and propose methods for estimation and cancellation of this interference motivated by our work on printed color barcodes: specifically, using pilot blocks [10] or an expectation maximization (EM) approach [23]. Experimental setup, tests, and results are described in Part 3. The application concludes with a summary and discussion in Part 4.

Definitions

Display capture process: In this application, three monochrome barcodes are encoded into a color barcode which is displayed on any suitable display, typically a computer display. The displayed image is then imaged by any suitable imager, typically a camera of a mobile device, such as a smart phone or tablet.

Cross Channel Interference: Cross channel interference is a type of interference encountered when displaying and capturing a three channel color image. The values for a given channel in the captured image are determined not only by the corresponding displayed channel but also by the other different channels. For example, in a RGB system, where the three channels are red (R), green (G), and blue (B) for both display and capture by imaging the display, ideally the R channel value in the captured image should depend only on the R channel value in the displayed image and be independent of the values in the G, and B channels. However, due to cross channel interference in the real world, the captured R channel image includes undesired influences from the G and B channels.

Coherent barcode designs: In a coherent design of a per-channel color barcode, the individual barcodes for the three channels are designed in a coordinated fashion to share a common geometric layout of the synchronization marker patterns and the individual data carrying modules, even though the data in the individual channels are independent of each other. Because the synchronization marker patterns coincide in the different channels in coherent designs, the colors of the synchronization marker patterns can be changed as desired, such as to pre-determined combinations of the individual channels, which can then be used to estimate the parameters for the color interference cancellation matrix. The pilot block approach is an example suitable for decoding the coherent design of per-channel color barcodes.

Incoherent barcode designs: An incoherent barcode design does not need coordination of the individual barcodes for the three channels. The incoherent barcode design approach offers greater flexibility because the geometric layout of the synchronization marker patterns and the data carrying modules in the individual constituent barcodes for the individual channels can be independent of each other. In fact, the three individual constituent barcodes can also be totally different types of barcodes combining, for example, a QR code in the R channel, with an Aztec code in the G channel, and a DataMatrix code in the B channel. The colors for the synchronization marker patterns in displayed incoherent RGB color barcodes cannot be set to arbitrary desired values because the individual color barcodes are not guaranteed to have the synchronization marker patterns in alignment. Therefore, the pilot block approach for estimation of interference parameters does not work for an incoherent design. However, an expectation maximization (EM) machine-learning approach can be used to estimate the color interference cancellation matrix for an incoherent barcode design.

Part 1 Introduction

Display applications of barcodes, and specifically color barcodes for such applications are described hereinbelow. While display applications of barcodes are more recent than the longstanding print-based applications, they are becoming increasingly common. Just like their print counterparts, barcodes displayed on electronic displays are increasingly used by users to connect with online sources of information by capturing an image of the displayed barcode with an application installed on their smartphones. Applications of this type include connectivity for advertised content, immediate information access (for instance at transit points), and for encoding boarding pass information displayed on smartphones to automate boarding (Aztec codes are common for this application). The capability for interactivity with display barcodes also enables additional applications [11]. Different barcodes such as Visual Code [12], Spot code [13] and Magneti-Code [14] have been used as visual tags for interaction with large screens. A secured barcode based communication system (SBVLC) [15] has been used for information sharing, secured device pairing, and other security related applications. The use of barcodes has also been proposed for automating point of sale transactions such as checkout payment systems, which are now seeing deployment with the recently announced Walmart Pay, a QR code enabled smartphone-based mobile payment system from the US's biggest retailer Walmart [16, 17]. In several of these applications, barcodes are competing with near field communication (NFC) [18] and the closely related radio frequency identification (RFID) tag [19, 20, 21] technologies (See [11] for a recent comparison).

Most barcodes used for display applications have been based on monochrome i.e. black and white barcodes. Because, nearly all displays and smartphone cameras today are color-capable, there are no cost or accessibility barriers to using color barcodes instead of the monochrome versions. Compared to monochrome barcodes, color barcodes offer the potential for higher information capacity through better utilization of the available channel from the display to the smartphone camera. For temporal streaming of data between screens and smartphones, two recent efforts [6, 22] have proposed the use of specially designed color display barcodes. The specialized barcode designs, however, target only the specific niche of data streaming, compared to the much broader class of applications typical of standardized barcodes. Also, they have only undergone rather limited testing and are missing key features such as robust synchronization capability and forward error correction, features that should be present for actual deployments and for comparison with already existing monochrome alternatives.

In this application, we describe a per channel framework for decoding coherent or incoherent color barcodes displayed on a display, typically a computer display. We describe a new framework and demonstrate that, for display applications, far less color interference is encountered compared to what was observed in our previous work for print color barcodes. We also present analysis specific to our described per channel color barcodes for display which provides an appropriate model for color interference with minimal approximations that provides physical intuition and enables methods for estimation and cancellation for performance improvements. Results for tests conducted with QR and Aztec codes in our framework across multiple displays and smartphones demonstrate that the described framework is effective: observed bit error rates are below 1.23% natively and further decreased upon interference cancellation. Both coherent designs where the synchronization marks are aligned between the individual channel barcodes and incoherent designs that do not exhibit these constraints are shown to perform well in the described framework.

In U.S. Pat. No. 9,111,186, COLOR BARCODES FOR MOBILE APPLICATIONS: A PER CHANNEL FRAMEWORK, issued Aug. 18, 2015, we described a different framework for extending monochrome barcodes to color. In that system and method, the framework encoded independent data in each of the cyan, magenta, and yellow print colorant channels commonly used in color printing, and decoded the data from each of the complementary red, green, and blue channels in captured color channels ['186 patent, 10]. The '186 patent is incorporated herein by reference in its entirety for all purposes.

Because of the inherently different physics of displays and printers, a new and different system and method based on different models and a different methodology had to be developed to realize an efficient and robust encoding and decoding system and method is now described in more detail hereinbelow.

Part 2 Per-Channel Display Color Bar Codes

FIG. 1 (prior art) illustrates an example of the geometric layout for a 2D barcode identifying the regions corresponding to the so called finder patterns used for synchronization and the individual data carrying modules where the information carried in the barcode is encoded. For example, in black and white barcodes, bits are encoded within the individual data carrying modules by making these modules black or white based on the value of the bit corresponding to the module. The sample shown corresponds to a QR code and other 2D barcodes which have their own geometric layouts definable in analogous fashion, typically with readily identifiable synchronization and data carrying modules.

2.1 Data Encoding and Decoding: Independent messages m1, m2, m3 are encoded as three individual monochrome barcodes that are placed in the three channels (R, G, and B respectively) of a color image, thereby forming our per-channel color barcode.

Figure 2:
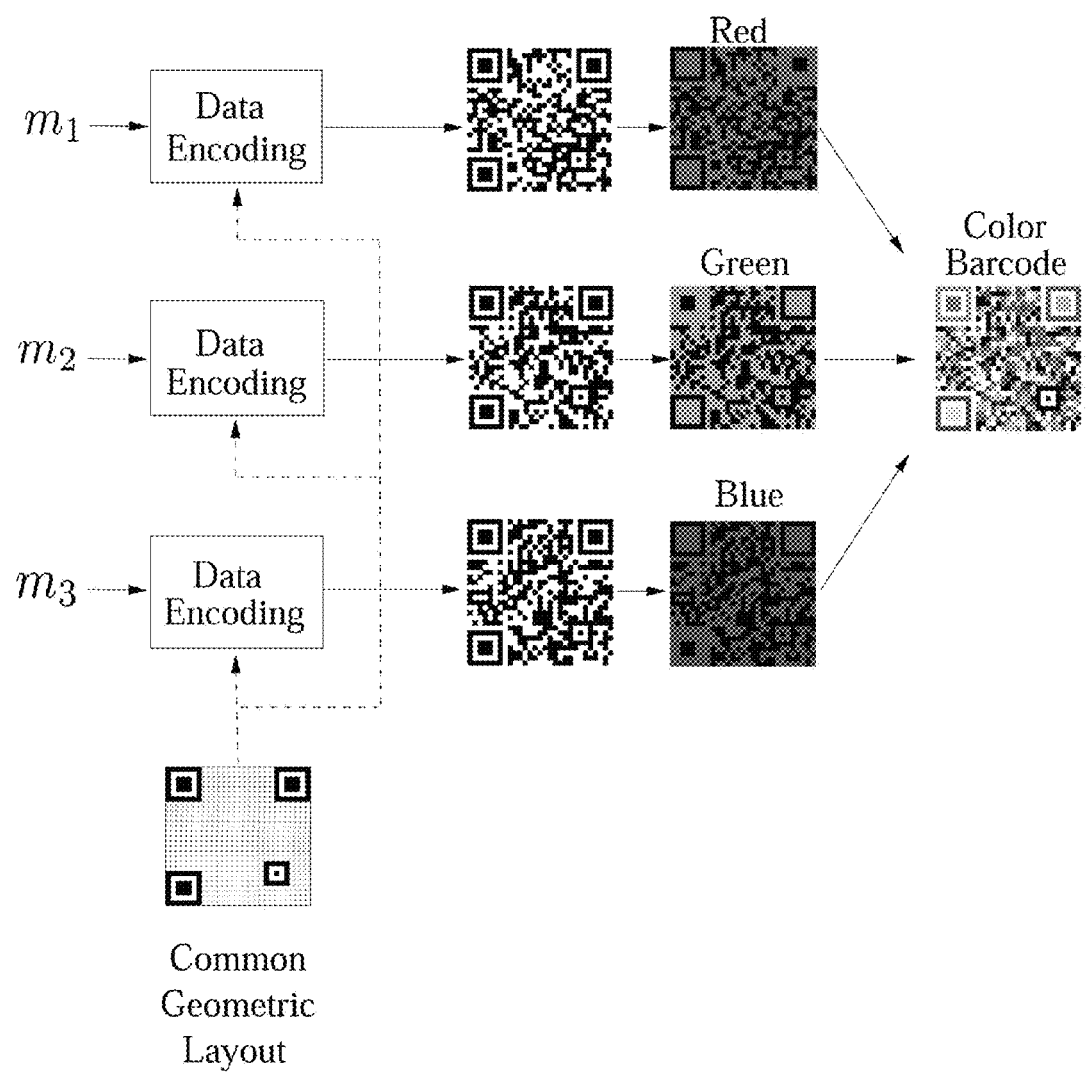
FIG. 2 shows a flow diagram for per-channel encoding for color display barcodes using an exemplary coherent design.

FIG. 2 shows a flow diagram of per-Channel encoding process for generating a coherent RGB color barcode. Observe that the generation of the barcodes in the coherent design should be coordinated to adhere to a single barcode type with a common geometric layout for the synchronization finder patterns and the data carrying modules for the barcodes. As shown in FIG. 2, the monochrome barcodes embedded in each of the R, G, and B channels are spatially aligned to the common geometric layout so that the synchronization pattern locations would coincide. Also, as demonstrated in FIG. 2, in the process of embedding the monochrome barcodes into the R, G, and B channels of the coherent color barcode image the regions in the coherent RGB color barcode image that comprise the synchronization patterns are modified. These modifications set the colors of these regions to preselected combinations of R, G, and B forming pilot blocks for facilitating decoding by enabling ready estimation of the color interference parameters, by a process that will be described subsequently in this part. Note that this manipulation does not impact the data encoded in the barcodes because the synchronization patterns of the monochrome barcodes are used only for synchronization and do not carry any of the data encoded into the individual monochrome barcodes. The modification of the colors in the synchronization patterns does imply that synchronization recovery for coherent barcode designs can be performed by using the R, G, and B channels together because individual channels are typically missing some parts of the synchronization patterns. Synchronization recovery for coherent designs is addressed later in this part in the description of FIG. 4 when considering the decoder for the coherently encoded RGB color barcodes.

Figure 3:
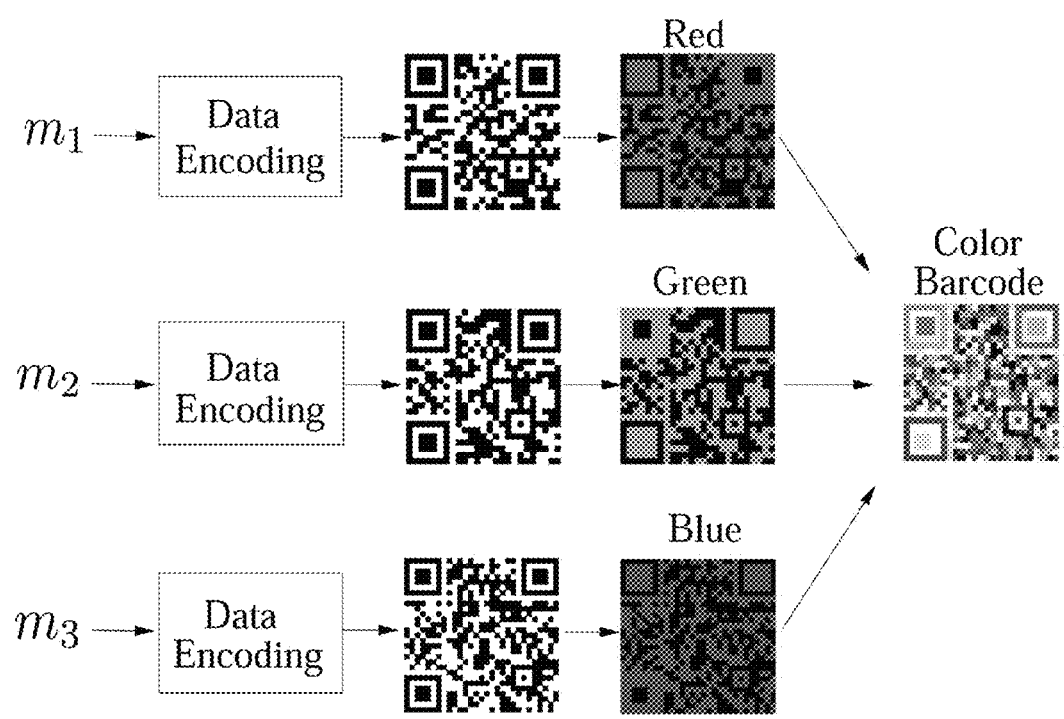
FIG. 3 shows a flow diagram for per-channel encoding for color display barcodes using an exemplary incoherent design.

FIG. 3 shows a flow diagram of per-Channel encoding process for generating an incoherent RGB color barcode. Observe that the generation of the barcodes in the incoherent design does not need to be coordinated to adhere to a common geometric layout for the synchronization finder patterns and the data carrying modules for the barcodes. Also, though the figure shows a situation where all three barcodes are of the same type this is not a constraint for encoding incoherent barcodes and the three barcodes may be of different types and are embedded within a common spatial area of the encoded RGB color barcode only in order to better exploit the area allocated to the color barcode. Because each of the RGB channels carries a complete monochrome barcode, localization of the synchronization patterns and alignment of the geometric layout of the encoded barcode to the image in a given channel can be performed individually provided the interference is not excessive. However, because the synchronization patterns are not co-registered, we cannot change the colors for the regions corresponding to the synchronization patterns in order to enable better estimation of the cross-channel color interference. Alternative more sophisticated methods are needed to estimate the color interference parameters, which are addressed later in this part in the description of FIG. 5 when considering the decoder for the incoherently encoded RGB color barcodes.

In both coherent and incoherent designs, encoding of messages in monochrome barcodes also typically incorporates error correction coding (at any suitable level) which can help in error recovery during data extraction from captured barcode images. The resulting color barcode can be displayed on any suitable RGB display.

An image of the displayed color barcode can be captured by any suitable imager, such as, a cell phone or tablet computer camera. The phone, typically a smart phone or tablet computer, running an application (app) on its processor, can attempt recovery of the encoded data using the process outlined by FIG. 4 for the coherent RGB color barcodes and by FIG. 5 for incoherent RGB color barcodes. In an ideal situation, the camera R, G, and B channels capture only the variation in the corresponding display R, G, and B channels and there is no impact of the displayed channel on non-matching capture channels. Under this ideal situation, R, G, and B channels form three non-interacting parallel channels each of which carries an independent data stream, and the data is extracted from the R, G, and B capture channels just as it would be for a monochrome barcode.

However, in practice, the individual channels of the captured image include contributions from images in channels other than the matching display channel, a phenomenon referred to as "cross channel interference".

Figure 6D:
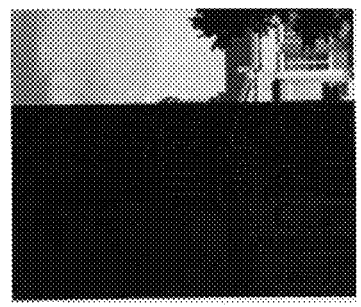
FIG. 6D shows the B channel from a smartphone capture of the image of FIG. 6A.
Figure 6C:
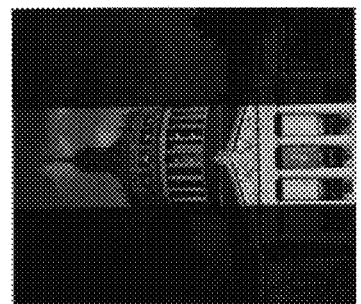
FIG. 6C shows the G channel from a smartphone capture of the image of FIG. 6A.
Figure 6B:
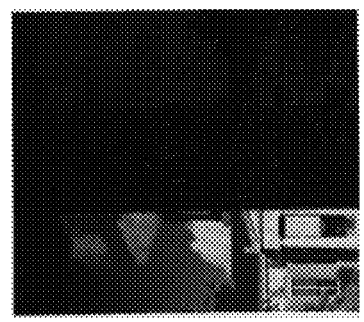
FIG. 6B shows the R channel from a smartphone capture of the image of FIG. 6A.
Figure 6A:
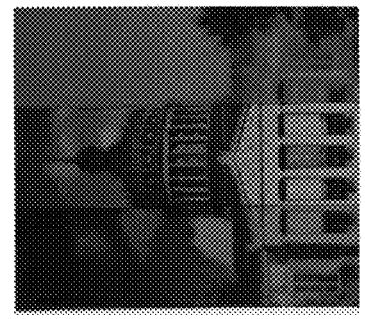
FIG. 6A shows a displayed image of three stripes with only one of the R, G and B channel active in each of the stripes.

FIG. 6A, FIG. 6B, FIG. 6C, and FIG. 6D demonstrate the effect of cross channel interference as is typically encountered in the per-channel framework. FIG. 6A shows a displayed image with three stripes. Only one of the R, G and B channel is active in each of the stripes. FIG. 6B, FIG. 6C, and FIG. 6D show each the R, G and B individual channels respectively, of a photograph taken by a smartphone camera of the displayed image of FIG. 6A. The effect of color interference can be seen where information shows in the stripes from different channels which should ideally be null of information, or black. In this example, it can be seen that the cross channel interference is relatively small with the most effect of color interference showing on the green channel. Both of the right and left stripes of the FIG. 6C, G channel should ideally be black with no information from the other channels (R, B). FIG. 6C correctly displays the green (G) information of the center stripe. However, there is also information present in the G channel from both the R channel (left side of FIG. 6C) and from the B channel (right side of FIG. 6C). Such cross channel interference can result in a decoding failure when the captured image is directly fed into the decoder software.

Therefore, it is desirable to have a system and method to accurately encode and decode multi-channel color barcodes in the presence of real world color interference. A new system and method based on a physical model for the display and capture process which allows for a parameterization of the cross channel interference as a linear 3×3 mixing matrix is described in more detail hereinbelow. By use of a system and method based on such a physical model, the cross channel interference can be estimated and substantially canceled. Before describing the specifics of the modeling, estimation, and correction process, we first describe the overall systems for data decoding for the coherent and incoherent designs.

Figure 4:
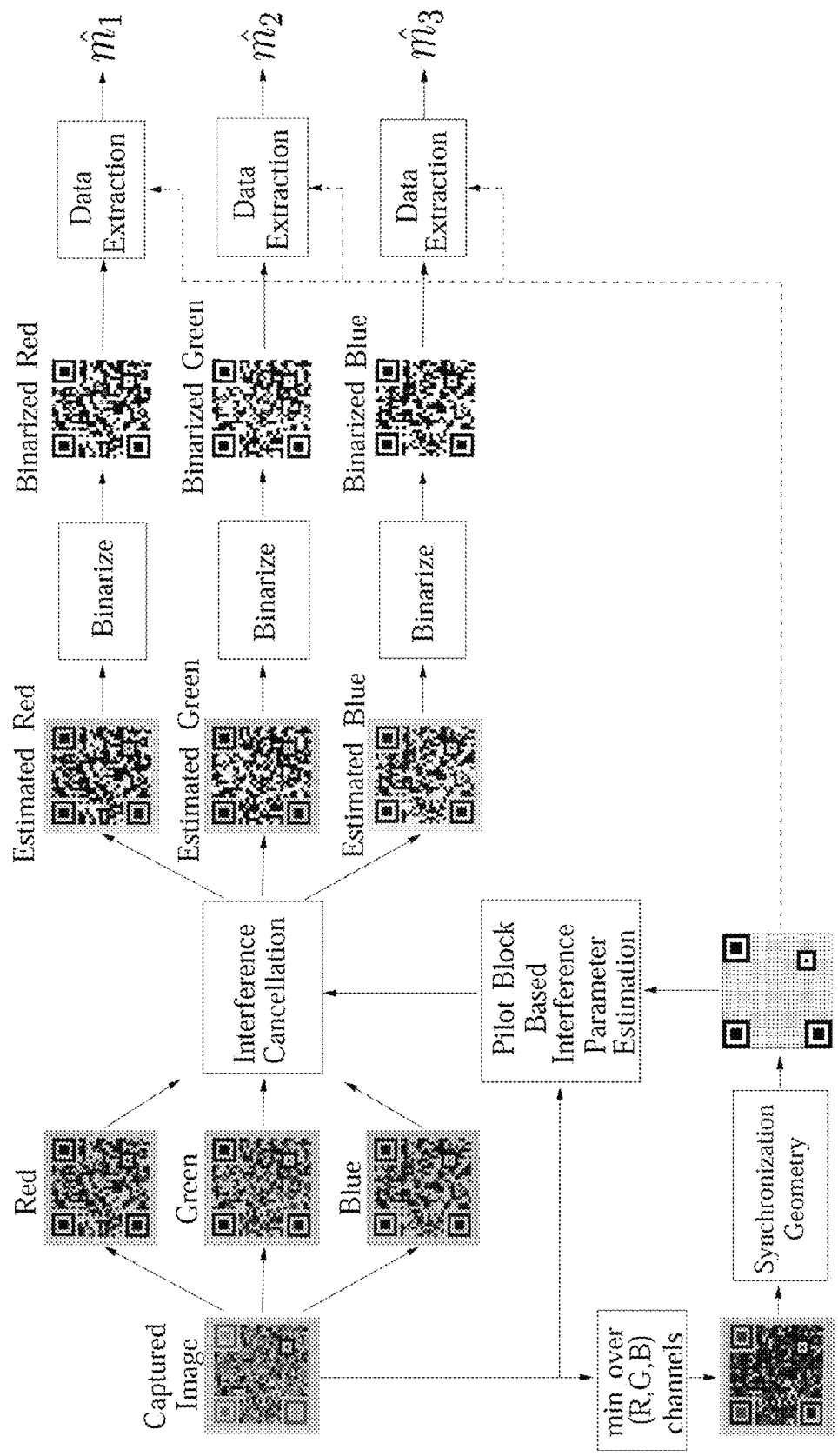
FIG. 4 shows a flow diagram for data decoding from a captured image of a displayed per-channel barcode using an exemplary coherent design.

FIG. 4 shows an exemplary data decoding from a captured image of a displayed per-channel barcode of a coherent design. Because the synchronization patterns used in the individual channels are typically manipulated to carry pilot block data in order to facilitate estimation of color interference in the coherent designs, typically no single channel contains a complete synchronization pattern. However, typically, the choice of the manipulation at the coherent encoder can be made such that two properties are met. First, the white regions in the synchronization patterns of the three constituent monochrome barcodes, which are encoded as the highest value of 255 in an 8 bit single channel image representation, remain white in the encoded coherent RGB barcoded image, i.e., have all three of the R, G, and B values as 255 (meaning that the values for these regions are inserted into the R, G, and B channels without any changes). Second, the black regions in the synchronization patterns of the three constituent monochrome barcodes, which are encoded as the lowest value of 0 in an 8 bit single channel image representation, maintain a value of 0 in at least one of the three R, G, and B values (meaning that these regions are changed to colors where the individual R, G, and B values are 0 or 255 but all three cannot be simultaneously 255). When these two properties are satisfied, it is readily seen that the image obtained by setting each pixel value to be the minimum of the R, G, and B channel images in the encoded coherent barcode image preserves the black and white regions of the synchronization patterns. Based on this observation, the monochrome greyscale image formed by taking the pixel by pixel minimum over the captured image of the barcode can be used in the same procedure that is used for conventional black and white monochrome barcodes to localize the synchronization patterns in said captured image of coherent RGB color barcode and to determine the geometric layout of the coherent color barcode and the alignment of the geometric layout to the captured image of the coherent RGB color barcode. Once the localization and alignment is available the RGB pixel values corresponding to the different regions of the synchronization patterns can be extracted from the captured image of the coherent RGB color barcode and using the known pilot block RGB values encoded for these regions in the encoder, the parameters for the RGB cross-channel interference can be estimated. Details of this estimation procedure are described hereinbelow in part 2.2. Once estimated parameters for the cross-channel color interference are known, the effects of the color interference can be eliminated by transforming the RGB values in the captured RGB coherent color barcode image to estimated RGB values for the encoded coherent barcode image that is free from cross-channel interference, a process that is referred to herein as interference cancellation. The R, G, and B channels of the interference-cancelled image can then be used along with the geometric layout and alignment information for decoding the data embedded in each of the channels of the per-channel coherent RGB color barcode.

Figure 5:
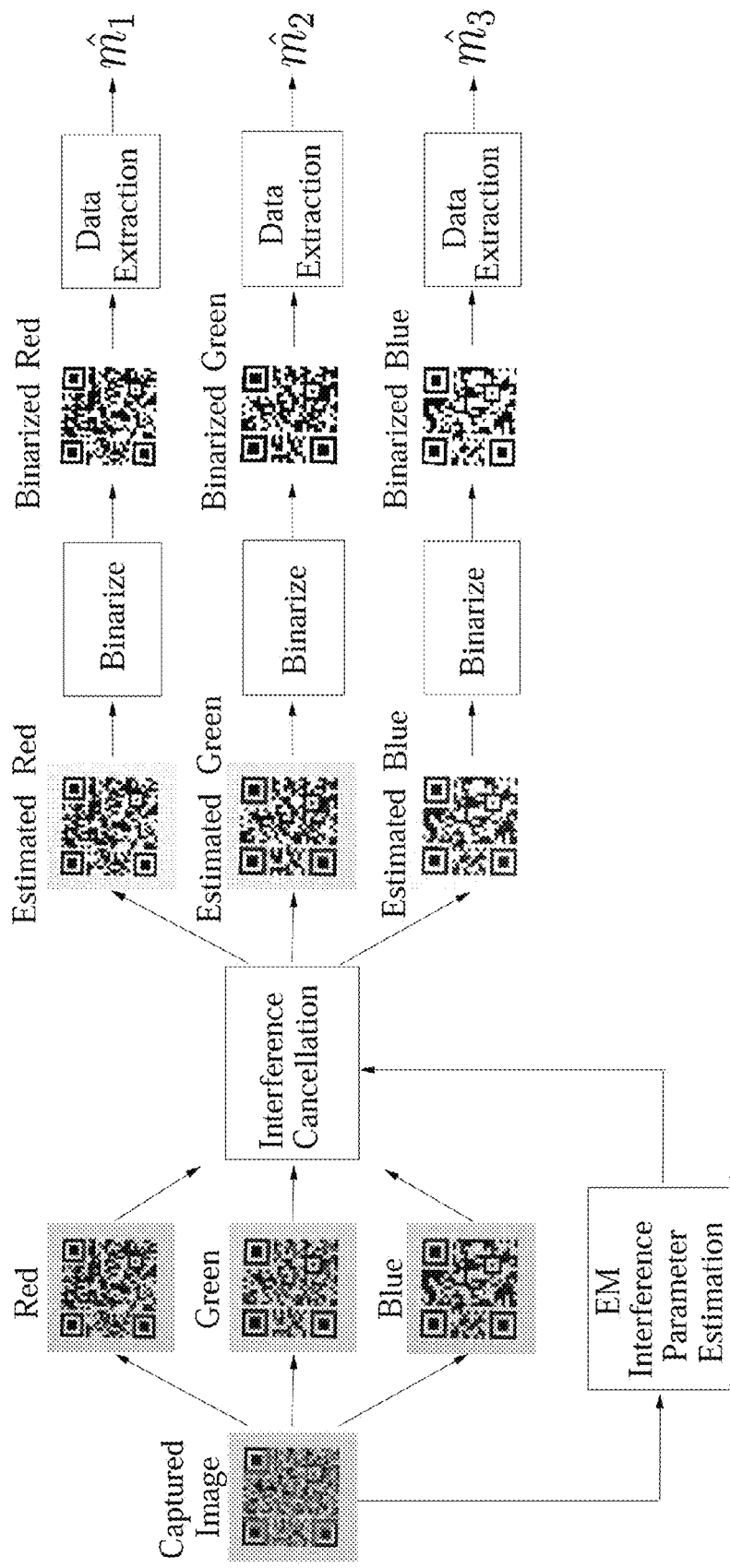
FIG. 5 shows a flow diagram for data decoding from a captured image of a displayed per-channel barcode using an exemplary incoherent design.

FIG. 5 shows an exemplary data decoding from a captured image of a displayed per-channel barcode of an incoherent design. In this case, a spatial region corresponding to the incoherent RGB color barcode is located within the captured image. Decoding may be performed, for instance, by separating the captured image is into its red (R), green (G), and blue (B) channels as three monochrome greyscale images and localizing the synchronization patterns for the monochrome barcode embedded in one or more of the channels within the corresponding channel monochrome grey image and using said localization to identify a spatial region corresponding to the incoherent RGB color barcode. In some embodiments, the channel with the least cross channel contribution from other channels can be used in this decoding process to minimize chances of the cross-channel interference impacting the localization. Alternatively, localization can be performed on the monochrome greyscale images corresponding to multiple channels the results combined based on confidence to identify a spatial region corresponding to the incoherent barcode. Note that the identified spatial region need not precisely match the full extent of the region corresponding to the incoherently encoded RGB color barcode and the method can work with a subset of this region that has adequate diversity of the RGB combinations used in the barcodes and enough pixels to allow for mitigating the impact of noise. The RGB pixel values in the identified spatial regions corresponding to the incoherent RGB color barcode can then be utilized to estimate the parameters of the RGB cross-channel interference in the captured image. An exemplary approach for performing this estimation is described subsequently in part 2.2, where based on a physical model the color interference is modeled as a 3×3 linear mixing relation and the corresponding mixing matrix which constitutes the parameters for the cross-channel interference can then be an expectation-maximization (EM)-type procedure via an alternating least squares process. Once estimated parameters for the cross-channel color interference are known, the effects of the color interference can be eliminated by transforming the RGB values in the captured RGB incoherent color barcode image to estimated RGB values for the encoded incoherent barcode image that is free from cross-channel interference, a process that is referred to herein as interference cancellation. For the exemplary model-based approach that models the cross channel interference as a linear 3×3 mixing, the interference cancellation procedure corresponds to mapping, on a pixel by pixel basis, the RGB pixel values in the captured image of the RGB incoherent color barcode, through the inverse of the estimated 3×3 mixing matrix to obtain estimated RGB values for the encoded incoherent barcode image that is free from cross-channel interference. The estimated interference cancelled image can then be separated into three monochrome greyscale images corresponding to its R, G, and B channels, and for each of these monochrome images barcode decoding can be performed using the process used for decoding of monochrome black and white barcodes. Specifically, within each separated greyscale image for a given channel, the synchronization patterns can be located to obtain the geometric layout of the barcode embedded in the corresponding channel and the alignment of this geometric layout to the separated greyscale image and using this alignment the data embedded in the embedded barcode can be decoded.

As noted earlier in the description of FIG. 6, the amount of color interference typically seen with common RGB display devices and common RGB smartphone or tablet cameras is quite small. As a result, the presence of color interference can be ignored and, for both coherent and incoherent color RGB barcodes, one can separate the captured imaged into three monochrome grey images corresponding to the individual R, G, and B channels and apply the barcode localization and decoding procedures to these individual greyscale images as is done for monochrome barcodes. This process encounters some performance degradation compared to the more accurate interference cancellation methods. In some applications, however, the computational simplicity and directness of this simplified method may be chosen over the more sophisticated interference cancellation approaches and the present Application is understood to encompass such simplified realizations for the decoding process.

2.2. Physical Model for Display-Capture Process

Modeling the display-capture process enables us to understand the way and develop methods for mitigating its impact. Color displays are additive devices where the displayed spectrum at each pixel can be modeled as linear combination of the spectrum of R, G, B channels of the display [24] which we denote by $P_i(\lambda)$, $i \in \{R, G, B\}$ with the coefficients of the linear combinations determined by the image being displayed. We represent the displayed color barcode as three binary images $I_i^d(x,y)$ with $i \in \{R, G, B\}$ corresponding, respectively, to the R, G, and B channels with (x, y) denoting the pixel co-ordinates, and the d superscript indicating the displayed image. $I_i^d(x,y)$ is '1' when one of the R, G, or B display channel is turned on and '0' when off. The spatial spectral distribution of the displayed pattern is then given as $$r(x,y;\lambda) = \Sigma_{i \in \{R,G,B\}} I_i^d(x,y) P_i(\lambda). \quad (1)$$

Because we are looking at a bi-level image, gamma correction does not come into play.

The spectral sensitivity of the capture channels is denoted by $s_k(\lambda)$ where $k \in \{R, G, B\}$ represents the capture channels. The image captured by the camera can then be modeled as $$I_k^c(x,y) = \int s_k(\lambda) r(x,y;\lambda) d\lambda, \quad (2)$$

where $k \in \{R, G, B\}$ and $I_k^c(x, y)$ represents the captured pixel corresponding to the $k^{th}$ camera channel, and the c superscript indicating the captured image. For simplicity of notation, we assume identical pixel co-ordinates for the displayed and captured images. In practice, synchronization methods that are part of barcode designs enables the captured barcode image to be registered to the encoded version. Now by substituting (1) in (2), the relationship between captured pixel and displayed pixel is represented as $$I_k^c(x,y) = \Sigma_{k,i} q_{ki} I_i^d(x,y), \quad (3)$$

where $q_{ki} = \int s_k(\lambda) P_i(\lambda) d\lambda$ represents amount that a display pixel from $i^{th}$ display channel that is turned on (that is, having $I_i^d(x, y)=1$) contributes to the captured pixel $I_k^c(x,y)$ corresponding to $k^{th}$ capture channel. Note that, in contrast with the per-channel printed barcodes considered in [10], the model for our per-channel display barcodes is inherently linear without requiring extensive simplifying assumptions. Hence if we know $q_{ki}$ for $k \in \{R, G, B\}$ and $i \in \{R, G, B\}$, relation given in (3) allows us to perform the interference cancellation and estimate the display channels. The $q_{ki}$ values can be represented as matrix Q where the $i^{th}$ column is $[q_{Ri}, q_{Gi}, q_{Bi}]^T$. Hence, display channels $I^d = [I_R^d, I_G^d, I_B^d]$ at a location (x, y) is obtained from the camera capture channels $I = [I_R^c, I_G^c, I_B^c]$ at that location by $$I^d = Q^{-1} I^c. \quad (4)$$

Using the above equation we can estimate the display channels. However, the matrix Q is usually unknown and we therefore propose two approaches to estimate the matrix that are analogous to those proposed in [10].

2.3 Color Interference Cancellation a) Pilot Block Approach: In this method, the individual barcodes are designed coherently so that the synchronization patterns for these codes (and the data encoding modules) are aligned. FIG. 2 and FIG. 4 illustrate the encoding and decoding processes for such a coherent design, where the finder patterns for the individual barcodes are aligned and the displayed color barcode shows a sample color pilot block allocation. The six pilot blocks present in the coherent barcode are combinations of the primaries used to create the color barcode i.e R, G, B, RG, RB, and GB (optionally, the white regions of the synchronization patterns may also be used in the estimation process just like the allocated pilot blocks). As already noted, because the blocks corresponding to the synchronization patterns do not carry any data, their colors can be selected at the encoder and the knowledge can be exploited at the decoder for estimating the cross channel interference matrix Q. We refer to this as pilot block approach based on the similarity with pilot symbols for estimating channel state in communication systems [25].

In order to estimate the matrix Q, the displayed pilot block barcode image is captured and R, G, B values at the pilot block positions are sensed which corresponds to $I_R^c, I_G^c$, and $I_R^c$ at those positions. Since the pilot blocks are the combinations of R, G, and B, the $I_R^d, I_G^d$, and $I_R^d$ are also known. In order to estimate the matrix Q, the least squares method is adopted. After obtaining the matrix Q, we use equation (4) to estimate $I^d$ at every pixel. As a result we get three grayscale images corresponding to encoded estimates of the independent channels encoded in the color barcode.

Before feeding the interference canceled images to the decoder, the images are binarized. We use an adaptive thresholding (AT) technique to convert the grayscale image to binary image. Here, the intensity values at the pilot blocks are utilized and a threshold is set for each of the images. The thresholds are:

$$t_R = \frac{\max(I_R^R, I_R^{RG}, I_R^{RB}) + \min(I_R^G, I_R^B, I_R^{GB})}{2}, \quad (5)$$

$$t_G = \frac{\max(I_G^G, I_G^{RG}, I_G^{GB}) + \min(I_G^R, I_G^B, I_G^{RB})}{2},$$

$$t_B = \frac{\max(I_B^B, I_B^{RB}, I_B^{GB}) + \min(I_B^R, I_B^G, I_B^{RG})}{2},$$

where $I_k^j$ represents intensity of $k^{th}$ capture channel with $k \in \{R, G, B\}$ and $j^{th}$ pilot block with $j \in \{R, G, B, RG, RB, GB\}$ and $t_R, t_G, t_B$ represents the thresholds for each channel. The binary images are then fed to the decoder to decode the embedded data in each channel.

EM-type algorithm to estimate Q-b) Expectation Maximization (EM)-type approach: This algorithm does not require a coherent design for the barcodes. FIG. 3 and FIG. 5 illustrate the encoding and decoding processes for an incoherent design where the barcodes are all QR codes, although as noted previously this is not a requirement for the incoherent RGB color barcodes. The EM-type algorithm is an iterative algorithm where we can estimate $I^d$ and Q simultaneously. $I^d$ is treated as variable constrained between 0 and 1 and can be interpreted as the probabilities of R, G, and B primaries getting displayed at a particular pixel location on screen. The matrix Q is constrained to have only positive entries. The objective function to be minimized is $\|QI^d - I^c\|^2$. This results in an optimization problem where we alternately estimate $I^d$ and Q in such a way that the objective function is minimized. Because $I^d$ and Q are present in the objective function it can implemented as alternating constrained least squares as indicated in Algorithm 1. In this process algorithm, $I^c$, which represents a captured pixel, is chosen from a subset of pixels from the captured barcode. Hence $I^c$ represents a 3×k matrix for k pixels chosen from the image. To initialize matrix Q, the captured image is Otsu thresholded [26] and we use least squares to obtain initial estimate of Q. With initialization of Q and $0 \le I^d \le 1$ as constraint, $I^d$ is estimated. Using the estimated $I^d$ and Q≥0 as constraint we estimate the matrix Q. The process continues until the objective function minimizes below the predetermined threshold τ. After obtaining the matrix Q, equation (4) is used to estimate the display color channels $I^d$ at every location. In order to binarize the estimated channels we use the Otsu thresholding method [26] and feed the binary images to the decoder.

The pilot block approach is employed for the coherent barcode designs, whereas the EM type approach can be used to recover the data from both coherent and incoherent color barcodes. Incoherent color barcodes (see, for example, FIG. 3) have different data lengths and the alignment and synchronization patterns in each channel need not be aligned. Hence the EM type approach is advantageous in case of incoherently encoded color barcodes.

Part 3 Experimental Results

For our experiments, we chose the QR code and Aztec code because they are widely used in mobile applications. Color versions of these codes were generated in the described per-channel framework in three different sizes: 30 mm, 40 mm, and 50 mm and using two different error correction levels, L and Q, specified in the standards [2, 3]. Both coherent and incoherent designs of the codes were utilized in the experiments, where the coherent designs use the synchronization markers as pilot blocks as described in part 2. These barcodes were displayed on two displays and captured using four different smartphones. The resulting images were then separated into the individual R, G, and B channels which were used in the barcode decoding process, either directly after Otsu thresholding (OT) [26], or after interference cancellation using (for the coherently designed codes) the pilot block (PB+AT) approach or (for both the coherent and incoherent designs) the EM approach. For the EM approach the threshold was set as $\tau=10^{-5}$.

To evaluate performance of the algorithms we use Bit Error Rate (BER) and Decoding Success Rate (DSR) as the performance metrics. BER is the percentage of bits in error, in the recovered bit stream when compared to original bit stream prior to error correction decoding and DSR represents percentage of captured barcodes decoded successfully using the error correction decoding (for the Reed Solomon codes used). Because of space-limitations, we present only aggregate statistics highlighting our main findings.

Figure 7:
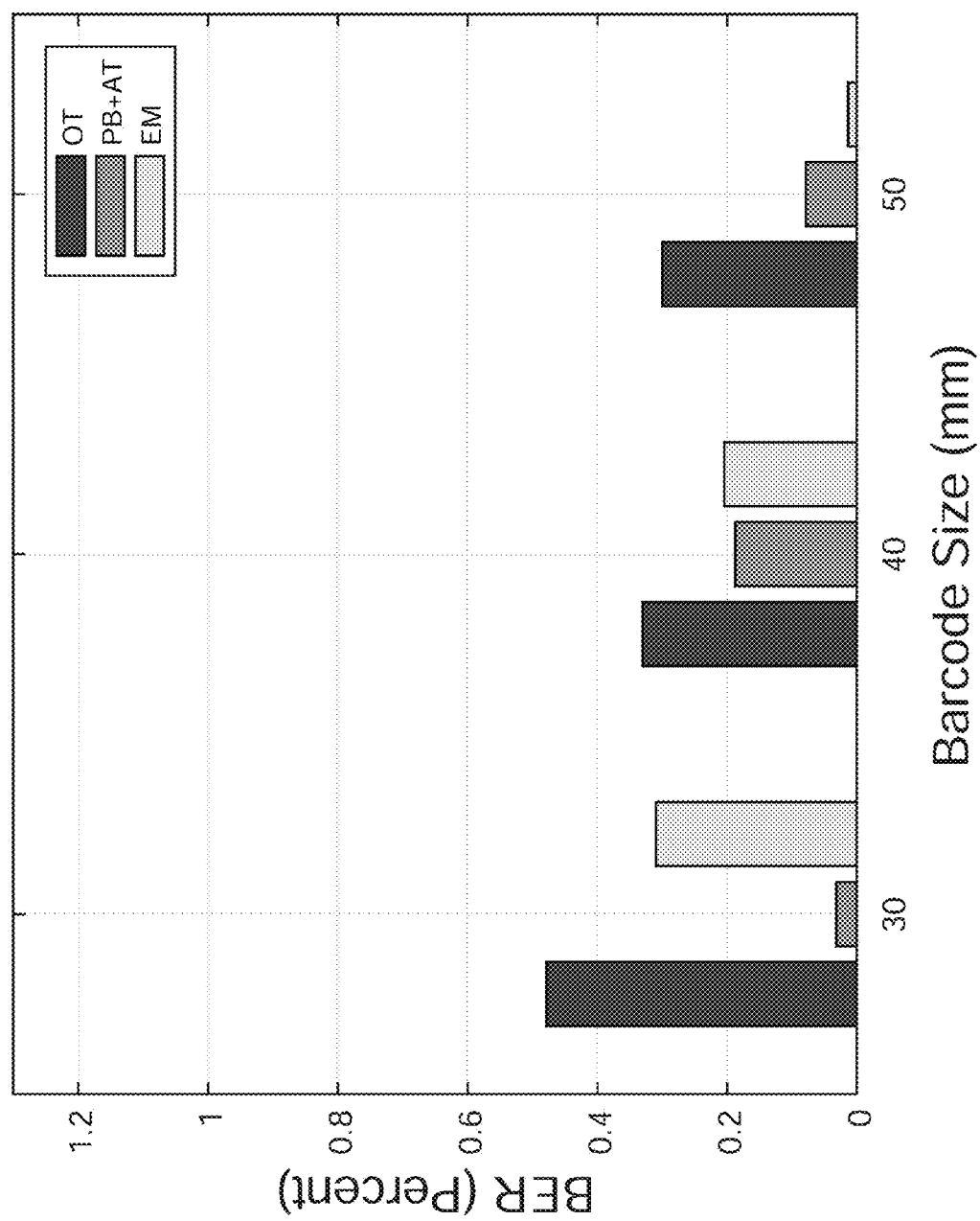
FIG. 7 is an exemplary graph showing BER vs Barcode size for the R channel.
Figure 8:
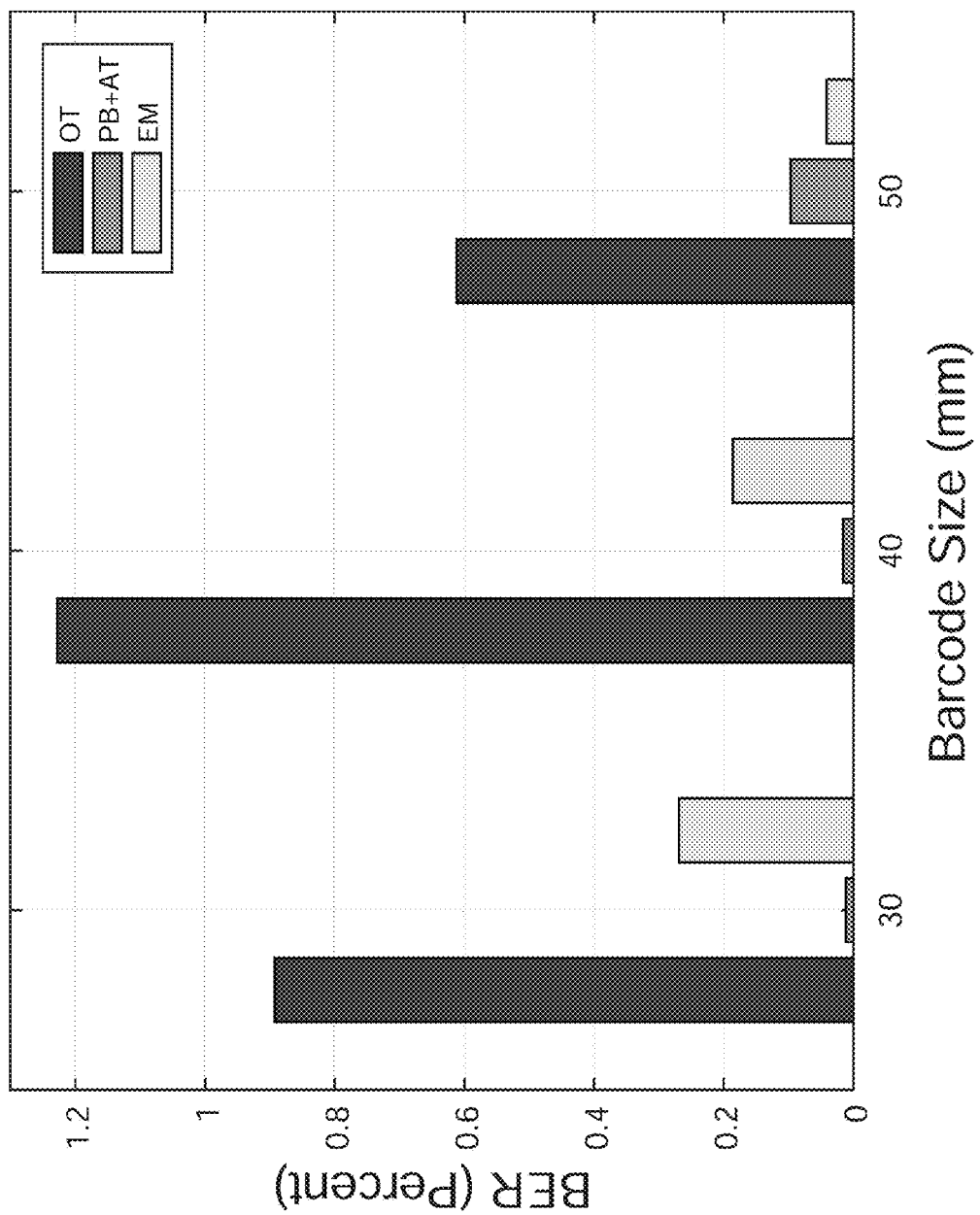
FIG. 8 is an exemplary graph showing BER vs Barcode size for the G channel.
Figure 9:
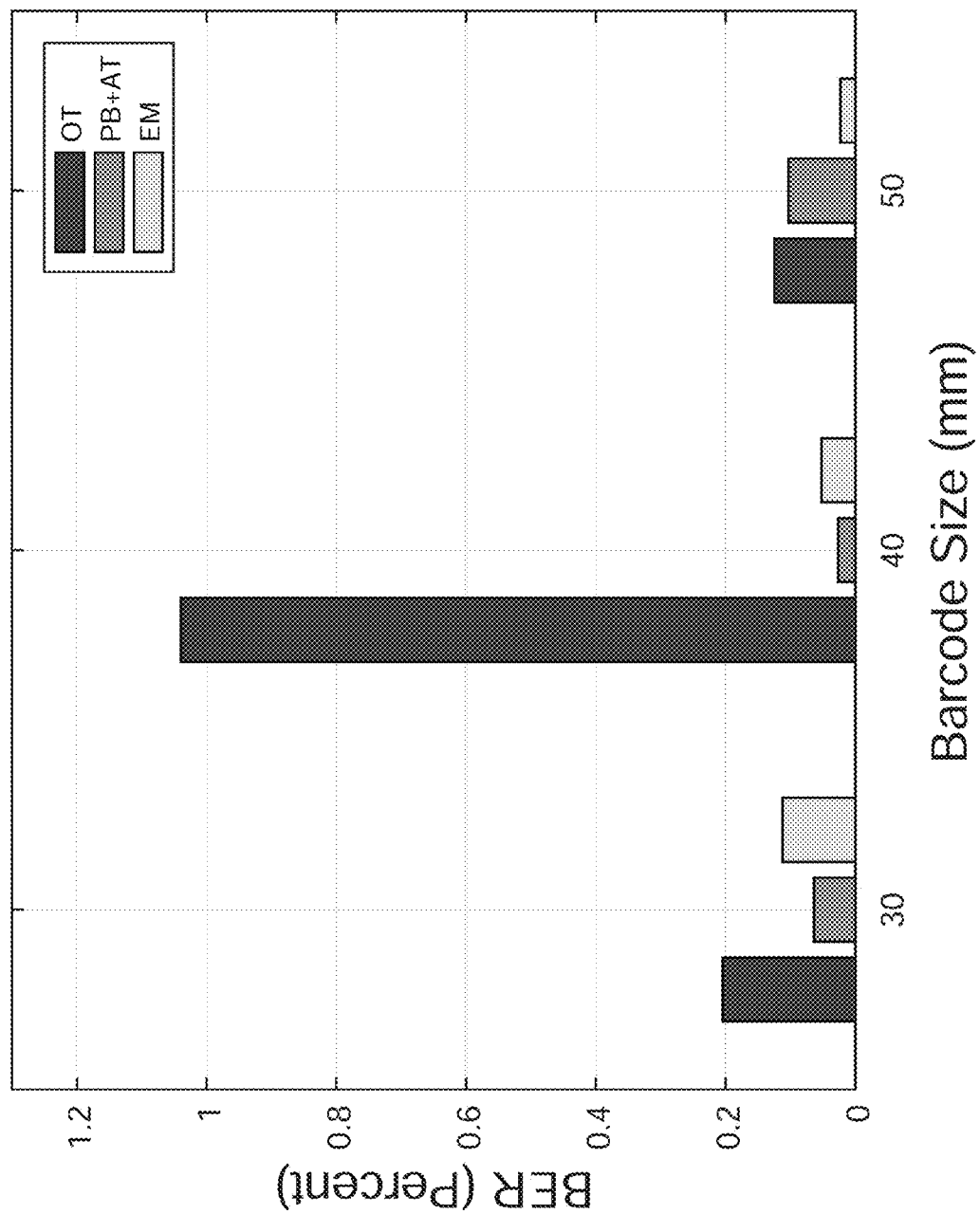
FIG. 9 is an exemplary graph showing BER vs Barcode size for the B channel.

The graph of FIG. 7, FIG. 8, and FIG. 9 summarize the percentage BER for three barcode sizes for the R, G, and B channels, respectively. In each channel and for each size of the color barcode, three bars represent the percentage BER for OT, PB+AT, and EM methods in order from left to right. We can observe that even without the interference cancellation the BER is less than 1.23% for the OT method and the interference cancellation reduces the BER further for both the PB+AT and EM methods, especially for the green channel where cross channel interference is higher compared to other channels. The PB+AT method usually performs slightly better that the EM method. Assuming a binary symmetric channel and 1.23% BER, which is an upper bound for our observed error rates, the estimated capacity of our color barcode scheme is 3×0.9043 bits per encoded module which is close to the maximum of 3 achievable with the framework. With interference cancellation the BER's were all below 0.31% providing an estimated capacity of 3×0.9697 bits per module.

While the low BER's obtained with OT without any interference cancellation were usually readily handled by the error correction codes utilized, the further reduction in BER's provided by interference cancellation was advantageous when errors are also introduced from other sources; for instance, for artistic and branding purposes [27] deliberate distortions are introduced in barcodes. The interference cancellation ensures better robustness in the face of such deliberate distortions. Table 1 of FIG. 10 shows the DSR comparison for OT, PB+AT and EM methods for red, green, and blue channels with the ratios indicating the number of successfully decoded cases to total number of cases. The DSR for the PB+AT and EM methods are better when compared to the OT method as observed from Table 1 of FIG. 10.

Part 4 Conclusion and Discussion

In this Application, we described a per-channel color barcode framework for display applications. We showed analytically that cross channel interference for our framework is quite small and can be further reduced via interference estimation and cancellation using either: the synchronization regions in coherently designed individual channel barcodes or via expectation maximization, which also applies to incoherent encoding of individual channel barcodes. In a battery of tests across multiple displays and smartphones, using both QR and Aztec codes, the raw bit error rate prior to forward error correction (FEC) were found to be under 1.23% for our framework and further reduced by interference cancellation. These errors are readily corrected using the FEC built into common barcodes such as the Reed-Solomon codes for the QR and Aztec codes. Interference cancellation also provides additional headroom for errors that are deliberately introduced through aesthetic modifications.

While the description and evaluation hereinabove assumes that three data sequences are embedded in the three RGB channels of the RGB barcode image, it will be appreciated by those skilled in the art that the principles and methods presented herein also apply to situations where only two out of the three R, G, and B channels are used in the encoding process and the final decoding also correspondingly recovers only two data sequences.

In summary, methods have been described hereinabove for encoding coherent RGB color barcodes and for decoding coherent RGB color barcodes displayed on a RGB display and captured by mobile device RGB camera. The method for encoding a coherent RGB color barcode includes generation of three monochrome barcodes with common geometric layout of synchronization finder patterns and data carrying modules, modifying a subset of the finder patterns based on chosen colors for pilot blocks that correspond to specific combinations of the display R, G, and B primaries, inserting the three barcodes within the three RGB channels of an image in alignment with a common geometric layout for creating a coherent RGB color barcode. The method for decoding includes: providing a RGB display and a mobile device having a mobile device RGB camera; displaying a coherent RGB color barcode on the RGB display to provide a displayed coherent RGB color barcode; capturing an image of the displayed coherent RGB color barcode by the mobile device RGB camera to provide a captured image of the coherent RGB color barcode displayed on the RGB display; estimating the common geometric layout of the barcodes forming the coherent RGB color barcode, using the pilot blocks in the synchronization patterns to estimate parameters for the color interference between the RGB channels; applying the per pixel color interference cancellation procedure to the captured image of the displayed coherent RGB color barcode to extract three separate monochrome grey images of each barcode of the coherent RGB color barcode; binarizing each of the three separate monochrome grey images of each barcode of the coherent RGB color barcode to provide three separate binarized images of each barcode of the coherent RGB color barcode; and decoding each of the three separate binarized images of each barcode of the coherent RGB color barcode to provide a decoded data for each barcode of the coherent RGB color barcode displayed on the RGB display. In an alternative embodiment of the decoding method, the interference estimation and cancelation procedure is omitted, potentially resulting in some performance degradation.

Also, methods are described for encoding incoherent RGB color barcodes and for decoding incoherent RGB color barcodes displayed on a RGB display and captured by a mobile device RGB camera. The method for encoding an incoherent RGB color barcode includes generation of three independent monochrome barcodes (with corresponding independent geometric layouts of synchronization finder patterns and data carrying modules) and inserting the three barcodes within the three RGB channels of an image for creating an incoherent RGB color barcode. The method for decoding includes: providing a RGB display and a mobile device having a mobile device RGB camera; displaying an incoherent RGB color barcode on the RGB display to provide a displayed incoherent RGB color barcode; capturing an image of the displayed incoherent RGB color barcode by the mobile device RGB camera to provide a captured image of the incoherent RGB color barcode displayed on the RGB display; using the captured barcode image to estimate parameters for the color interference between the RGB channels; based on the estimated parameters, applying the per pixel color interference cancellation procedure to the image of the displayed incoherent RGB color barcode to extract three separate monochrome grey images of each barcode of the incoherent RGB color barcode RGB color barcode; binarizing each of the three separate monochrome grey images of each barcode of the incoherent RGB color barcode to provide three separate binarized images of each barcode of the incoherent RGB color barcode; and decoding each of the three separate binarized images of each barcode of the incoherent RGB color barcode to provide a decoded data for each barcode of the incoherent RGB color barcode displayed on the RGB display. In an alternative embodiment of the decoding method, the interference estimation and cancelation procedure is omitted, potentially resulting in some performance degradation.

Software and/or firmware to perform the new methods of encoding RGB barcodes for display on a computer or device RGB display and for decoding RGB barcodes imaged from a computer or device RGB display using cross channel interference techniques can be provided on and/or run from a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, EPROM, EEPROM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] ISO/IEC, "Information technology—Automatic identification and data capture techniques—EAN/UPC bar code symbology specification,"
http://www.iso.org/iso/iso_catalogue/catalogue_ics/catalogue_detail_ics.htm?csnumber=46143, 2009, accessed January 2011.

[2] "Information technology—Automatic identification and data capture techniques—QR Code 2005 bar code symbology specification,"
http://www.iso.org/iso/iso_catalogue/catalogue_ics/catalogue_detail_ics.htm?csnumber=43655, 2006, accessed January 2011.

[3] "Information technology—Automatic identification and data capture techniques—Aztec Code bar code symbology specification,"
http://www.iso.org/iso/iso_catalogue/catalogue_tc/catalogue_detail.htm?csnumber=41548, 2008, accessed April 2011.

[4] A. Longacre and R. Hussey, "Two dimensional data encoding structure and symbology for use with optical readers," U.S. Pat. No. 5,591,956, 7 Jan. 1997.

[5] C. Sant'Anselmo, R. Sant'Anselmo, and D. C. Hopper, "Identification symbol system and method with orientation mechanism," U.S. Pat. No. 5,612,524, March 1997.

[6] T. Hao, R. Zhou, and G. Xing, "COBRA: Color barcode streaming for smartphone systems," in Procs. of the 10th Int. Conf. on Mobile Sys., App., and Services, ser. MobiSys '12. New York, N.Y., USA: ACM, 2012, pp. 85-98. [Online]. Available:
http://doi.acm.org/10.1145/2307636.2307645

[7] D. Parikh and G. Jancke, "Localization and segmentation of a 2D high capacity color barcode," in IEEE Workshop on Applications of Computer Vision (WACV), Copper Mountain, Colo., USA, January 2008, pp. 1-6.

[8] O. Bulan, H. Blasinski, and G. Sharma, "Color QR codes: Increased capacity via per-channel data encoding and interference cancellation," in Proc. IS&T/SID Nineteenth Color and Imaging Conference: Color Science and Engineering Systems, Technologies, and Applications, San Jose, Calif., 7-11 Nov. 2011, pp. 156-159.

[9] R. John and K. Raahemifar, "Designing a 2D color barcode," in 28th IEEE Canadian Conf. on, May 2015, pp. 297-301.

[10] H. Blasinski, O. Bulan, and G. Sharma, "Color barcodes for mobile applications: A per channel framework," IEEE Trans. Image Proc., vol. 22, no. 4, pp. 1498-1511, April 2013.

[11] G. Sharma, "Image-based data interfaces revisited: Barcodes and watermarks for the mobile and digital worlds," in 8th Intl. Conf. on Comm. Sys. and Networks (COMSNETS), Bangalore, India, January 2016. Available: https://doi.org/10.1109/COMSNETS.2016.7440021

[12] M. Rohs, "Real-world interaction with camera phones," in Ubiquitous Computing Systems. Springer, 2005, pp. 74-89.

[13] D. Scott, R. Sharp, A. Madhavapeddy, and E. Upton, "Using visual tags to bypass bluetooth device discovery," SIGMOBILE Mob. Comput. Commun. Rev., vol. 9, no. 1, pp. 41-53, 2005. [Online]. Available: http://doi.acm.org/10.1145/1055959.1055965

[14] M. Fetter, C. Beckmann, and T. Gross, "Magneticode: Physical mobile interaction through time-encoded magnetic identification tags," in Procs. of the 8th Intl. Conf. on Tangible, Embedded and Embodied Interaction, ser. TEI '14. New York, N.Y., USA: ACM, 2013, pp. 205-212. [Online]. Available: http://doi.acm.org/10.1145/2540930.2540963

[15] B. Zhang, K. Ren, G. Xing, X. Fu, and C. Wang, "SBVLC: Secure barcode-based visible light communication for smartphones," in IEEE INFOCOM Procs., April 2014, pp. 2661-2669.

[16] "Walmart launches mobile payments processor." http://www.businessinsider.com/walmart-launches-mobile-payments-processor-2015-12?IR=T, Posted on Dec. 14, 2015 in Business Insider.

[17] "Wal-mart adds to mobile wallet frenzy with walmart pay." http://www.reuters.com/article/us-wal-mart-mobilepayment-idUSKBNOTTOE620151210, Posted on Dec. 10, 2015 in Reuters.

[18] ISO/IEC, "ISO/IEC 18092:2013 Information technology—Telecommunications and information exchange between systems—Near Field Communication—Interface and Protocol (NFCIP-1)," 2013. [Online]. Available: http://standards.iso.org/ittf/PubliclyAvailableStandards/c056692_ISO_IEC_18092_2013.zip

[19] K. Finkenzeller, RFID Handbook: Radio-frequency identification fundamentals and applications. Wiley, 1999.

[20] ISO/IEC, "ISO/IEC 15693-1:2010 Identification cards—Contactless integrated circuit cards—Vicinity cards—Part 1: Physical characteristics," 2010. [Online]. Available: http://www.iso.org/iso/home/store/catalogue_tc/catalogue_detail.htm?csnumber=39694

[21] "ISO/IEC 14443-1:2008 Identification cards—Contactless integrated circuit cards—Proximity cards—Part 1: Physical characteristics." [Online]. Available: http://www.iso.org/iso/home/store/catalogue_tc/catalogue_detail.htm?csnumber=39693

[22] T. Langlotz and O. Bimber, "Unsynchronized 4D barcodes," in Advances in Visual Computing. Springer, 2007, pp. 363-374.

[23] O. Bulan and G. Sharma, "Improved color barcodes via expectation maximization style interference cancellation," in Proc. IEEE Intl. Conf. Acoustics Speech and Sig. Proc., Kyoto, Japan, March 2012, pp. 1509-1512.

[24] G. Sharma, "LCDs versus CRTs-color-calibration and gamut considerations," Procs. of the IEEE, vol. 90, no. 4, pp. 605-622, April 2002.

[25] J. G. Proakis and M. Salehi, Digital communications. McGraw-Hill, 2008.

[26] N. Otsu, "A threshold selection method from gray-level histograms," Automatica, vol. 11, no. 285-296, pp. 23-27, 1975.

[27] Z. Baharav and R. Kakarala, "Visually significant QR codes: Image blending and statistical analysis," in IEEE Intl. Conf. on Multimedia and Expo (ICME), 2013, July 2013, pp. 1-6.

What is claimed is:

1. A method of decoding a coherent RGB color barcode captured by a mobile device RGB camera by imaging the coherent RGB color barcode displayed by a RGB display comprising:

displaying a coherent RGB color barcode on said RGB display to provide a displayed coherent RGB color barcode;

capturing an image of said displayed coherent RGB color barcode by said mobile device RGB camera to provide a captured image of said coherent RGB color barcode displayed on said RGB display;

localizing synchronization patterns in said captured image to determine a geometric layout of the coherent color barcode and an alignment of the geometric layout to the captured image of the coherent RGB color barcode;

estimating parameters of an RGB cross-channel interference in said captured image by using regions of said captured image that comprise synchronization pattern regions and known predetermined pilot block values for these regions set during the coherent barcode encoding process;

using said estimated parameters to apply a per pixel color interference cancellation process to said image of said displayed coherent RGB color barcode to extract two or three separate monochrome grey images of each barcode of said coherent RGB color barcode; and decoding said two or three separate monochrome grey images to provide a decoded data for corresponding barcode of said coherent RGB color barcode displayed on said RGB display.

2. The method of claim 1, wherein said mobile device RGB camera comprises a smartphone or tablet computer camera.

3. The method of claim 1, wherein said step of providing a RGB display comprises providing a computer controlled LCD or LED display.

4. The method of claim 1, wherein said step of estimating parameters of the RGB cross-channel interference comprises estimating a color interference matrix, and said step of applying said per pixel color interference cancellation to said image of said displayed coherent RGB color barcode comprises applying a matrix transform determined by said estimated color interference matrix to RGB values in each pixel of said captured image of said coherent RGB color barcode displayed on said RGB display.

5. The method of claim 4, wherein said step of estimating parameters of the RGB cross-channel interference comprises estimating a color interference matrix by a least squares process.

6. A method of decoding a coherent RGB color barcode captured by a mobile device RGB camera by imaging the coherent RGB color barcode displayed by a RGB display comprising:

displaying a coherent RGB color barcode on said RGB display to provide a displayed coherent RGB color barcode;

capturing an image of said displayed coherent RGB color barcode by said mobile device RGB camera to provide a captured image of said coherent RGB color barcode displayed on said RGB display;

localizing synchronization patterns in said captured image to determine a geometric layout of the coherent color barcode and an alignment of the geometric layout to the captured image of the coherent RGB color barcode; and extracting as separate monochrome grey images and decoding at least two of three R, G, and B channels of said captured image of coherent RGB color barcode to provide a decoded data for corresponding barcode of said coherent RGB color barcode displayed on said RGB display.

7. A method of decoding an incoherent RGB color barcode captured by a mobile device RGB camera by imaging the incoherent RGB color barcode displayed by a RGB display comprising:

displaying an incoherent RGB color barcode on said RGB display to provide a displayed incoherent RGB color barcode;

capturing an image of said displayed incoherent RGB color barcode by said mobile device RGB camera to provide a captured image of said incoherent RGB color barcode displayed on said RGB display;

locating a spatial region corresponding to the incoherent RGB color barcode in said captured image;

estimating parameters of a RGB cross-channel interference in said captured image by using image RGB values in said located spatial region;

using said estimated parameters to apply a per pixel color interference cancellation process to said captured image of said displayed incoherent RGB color barcode to extract two or three separate monochrome grey images of each barcode of said incoherent RGB color barcode; and decoding said two or three separate monochrome grey images to provide a decoded data for corresponding barcode of said coherent RGB color barcode displayed on said RGB display.

8. The method in claim 7, wherein the locating of a spatial region corresponding to the incoherent RGB color barcode in said captured image further comprises extracting at least one of three R, G, and B channels of said captured image of coherent RGB color barcode as a separate monochrome grey image and localizing synchronization patterns for the monochrome barcode in said monochrome grey image and using said localization to identify a spatial region corresponding to the incoherent RGB color barcode.

9. The method of claim 7, wherein said mobile device RGB camera comprises a smartphone or tablet computer camera.

10. The method of claim 7, wherein said step of providing a RGB display comprises providing a computer controlled LCD or LED display.

11. The method of claim 7, wherein said step of estimating parameters of the RGB cross-channel interference comprises estimating a color interference matrix, and said step of applying said per pixel color interference cancellation to said image of said displayed incoherent RGB color barcode comprises applying a matrix transform determined by said estimated color interference matrix to the RGB values in each pixel of said captured image of said coherent RGB color barcode displayed on said RGB display.

12. The method of claim 11, wherein said step of estimating parameters of the RGB cross-channel interference comprises an expectation-maximization EM-type procedure to estimate said color interference matrix by an alternating least squares process.

13. The method of claim 12, wherein said EM-type procedure continues until an objective function is minimized below a preset threshold.

14. A method of decoding an incoherent RGB color barcode captured by a mobile device RGB camera by imaging the incoherent RGB color barcode displayed by a RGB display comprising:

displaying an incoherent RGB color barcode on said RGB display to provide a displayed incoherent RGB color barcode;

capturing an image of said displayed incoherent RGB color barcode by said mobile device RGB camera to provide a captured image of said incoherent RGB color barcode displayed on said RGB display;

extracting as separate monochrome grey images at least two of three R, G, and B channels of said captured image of incoherent RGB color barcode; and locating and decoding monochrome barcodes embedded in said at least two of three R, G, and B channels of said captured image of said incoherent RGB barcode to provide a decoded data for corresponding barcodes of said incoherent RGB color barcode displayed on said RGB display.

15. The method of claim 14 wherein the locating of the monochrome barcode embedded in a channel further comprises localizing synchronization patterns for the monochrome barcode in said monochrome grey image and using said localization to determine a geometric layout of the monochrome barcode and an alignment of the geometric layout to the monochrome grey image in the channel.

* * * * *